US005127143A

United States Patent [19]

Urlacher

[11] Patent Number: 5,127,143

[45] Date of Patent: Jul. 7, 1992

[54] APPARATUS FOR SEATING AN ELONGATED FLEXIBLE SPLINE IN A WINDOW FRAME TO SECURE A FLEXIBLE SCREEN THERETO

[75] Inventor: Dennis P. Urlacher, Mandan, N. Dak.

[73] Assignee: North Country Thermal Line, Inc., Mandan, N. Dak.

[21] Appl. No.: 610,001

[22] Filed: Nov. 7, 1990

Related U.S. Application Data

[63] Continuation-in-part of Ser. No. 503,211, Apr. 2, 1990, Pat. No. 5,052,093.

[51] Int. Cl.[5] ........ B23P 19/02

[52] U.S. Cl. ........ 29/235

[58] Field of Search ........ 29/235, 451, 460; 140/109; 404/64, 65, 74, 87; 52/741, 743, 744; 7/103; 269/228

[56] References Cited

U.S. PATENT DOCUMENTS

| | | | |
|---|---|---|---|
| 1,858,372 | 5/1932 | McNaught et al. | 29/267 |
| 3,734,481 | 5/1973 | Surwill | 269/228 |
| 3,828,832 | 8/1974 | Hartman | 29/235 |
| 4,005,735 | 2/1977 | Nason | 29/235 |
| 4,916,790 | 4/1990 | Vlahogeorge | 29/235 |

*Primary Examiner*—Robert C. Watson

*Attorney, Agent, or Firm*—Zarley, McKee, Thomte Voorhees & Seas

[57] ABSTRACT

A spline seating carriage is longitudinally movably mounted at one side edge of a support table upon which the window screen is positioned. The flexible screen material is layered over the screen frame and the flexible spline is positioned over the groove in the screen frame. A spline roller is movably mounted on the carriage and may be moved downwardly into a spline-engaging position to force the spline downwardly into the groove in the screen frame to secure the screen material thereof. The carriage is moved along the length of the screen frames so as to seat the spline along the entire periphery of the frame.

3 Claims, 5 Drawing Sheets

APPARATUS FOR SEATING AN ELONGATED FLEXIBLE SPLINE IN A WINDOW FRAME TO SECURE A FLEXIBLE SCREEN THERETO

CROSS REFERENCE TO RELATED APPLICATION

This is a continuation-in-part application of the application entitled APPARATUS FOR SEATING AN ELONGATED FLEXIBLE SPLINE IN A WINDOW FRAME TO SECURE A FLEXIBLE SCREEN THERETO, Ser. No. 07/503,211 filed Apr. 2, 1990, now U.S. Pat. No. 5,052,093.

BACKGROUND OF THE INVENTION

Conventional windows for homes or the like normally include a screen which consists of an aluminum frame having a fiber mesh screen material held in place with a flexible spline. The screen material is layered over the frame and the spline is rolled into a groove on the screen frame to tightly secure the screen material to the frame. Heretofore, the rolling procedure or spline positioning procedure was accomplished by a small hand-held roller. In order to seat the spline in the prior art method, a great amount of arm pressure was required. The required amount of arm pressure made it difficult from some employees to perform the same and many employees have developed tendonitis which resulted in lost production time and increased workers compensation claims.

In applicant's opinion, the apparatus disclosed in the co-pending application represented a significant advance in the art. The instant invention is believed to be an improvement over the apparatus of the co-pending application in that it has more adjustments, is smaller and more compact, and operates in an extremely smooth fashion. Further, the device of this invention is mounted on a rail positioned under the work bench.

It is therefore a principal object of the invention to provide an apparatus for seating an elongated flexible spline in a window screen frame to secure a flexible screen material thereto.

Yet another object of the invention is to provide an apparatus for seating an elongated flexible spline in a window screen frame to secure a flexible screen material thereto which does not require the exertion of arm pressure to accomplish the same.

Still another object of the invention is to provide an apparatus for seating an elongated flexible spline in a window screen frame which is more efficient than methods heretofore employed.

Yet another object of the invention is to provide an apparatus for seating an elongated flexible spline in a window screen frame which reduces employee fatigue and which reduces lost productivity.

Yet another object of the invention is to provide an apparatus for seating an elongated flexible spline in a window screen frame which permits an increase in the diameter of the spline thereby resulting in a more durable product.

Still another object of the invention is to provide an apparatus for seating an elongated flexible spline in a window screen frame which results in a product having a tight uniform screen.

Yet another object of the invention is to provide an apparatus for seating an elongated flexible spline in a window screen frame which is able to compensate for various widths and thicknesses of the frame.

Yet another object of the invention is to provide an apparatus for seating an elongated flexible spline in a window screen frame which is extremely compact.

Still another object of the invention is to provide an apparatus for seating an elongated flexible spline in a window screen frame which is easy to operate.

Still another object of the invention is to provide a device of the type described above which is economical of manufacture, durable in use and refined in appearance.

These and other objects of the present invention will be apparent to those skilled in the art.

SUMMARY OF THE INVENTION

An apparatus is described which enables the positioning or seating of an elongated flexible spline in the groove of a window screen frame to secure the flexible screen material thereto. A table is provided which includes a substantially horizontally disposed top surface having at least one side edge. A pair of elongated support members are positioned beneath the top surface of the table adjacent one side thereof. A slide or carriage is longitudinally movably mounted on the elongated support members and has a bracket secured thereto which extends horizontally outwardly therefrom and thence upwardly therefrom. A slide is vertically movably mounted on the bracket adjacent the upper end thereof. A spline roller is operatively secured to the slide with the mounting means including means for horizontally adjustably positioning the spline roller with respect to the slide. A body head is secured to the upper end of the bracket above the slide member and has a locking lever mounted thereon which has a shaft extending downwardly therefrom which is in engagement with the slide. The slide may be selectively vertically adjusted with respect to the body head to enable the apparatus to compensate for screen frames having varying thicknesses. The horizontal adjustment of the spline roller with respect to the slide permits the apparatus to be adjusted to compensate for screen frames having varying widths. The slide member and spline roller may be moved between a raised inoperative position and a lowered operative position. When the spline roller is in its raised inoperative position, one side of the screen frame may be positioned therebelow. The screen material is layered over the frame and the elongated flexible spline is positioned over the groove provided in the screen frame. The spline roller is then lowered to its operative position so that it forces the spline and the screen material downwardly into the groove of the screen frame. The carriage means is then moved longitudinally with respect to the screen frame so that the spline is progressively inserted into the groove along the entire length of that side of the frame.

DESCRIPTION OF THE PREFERRED EMBODIMENT

Figure 4:
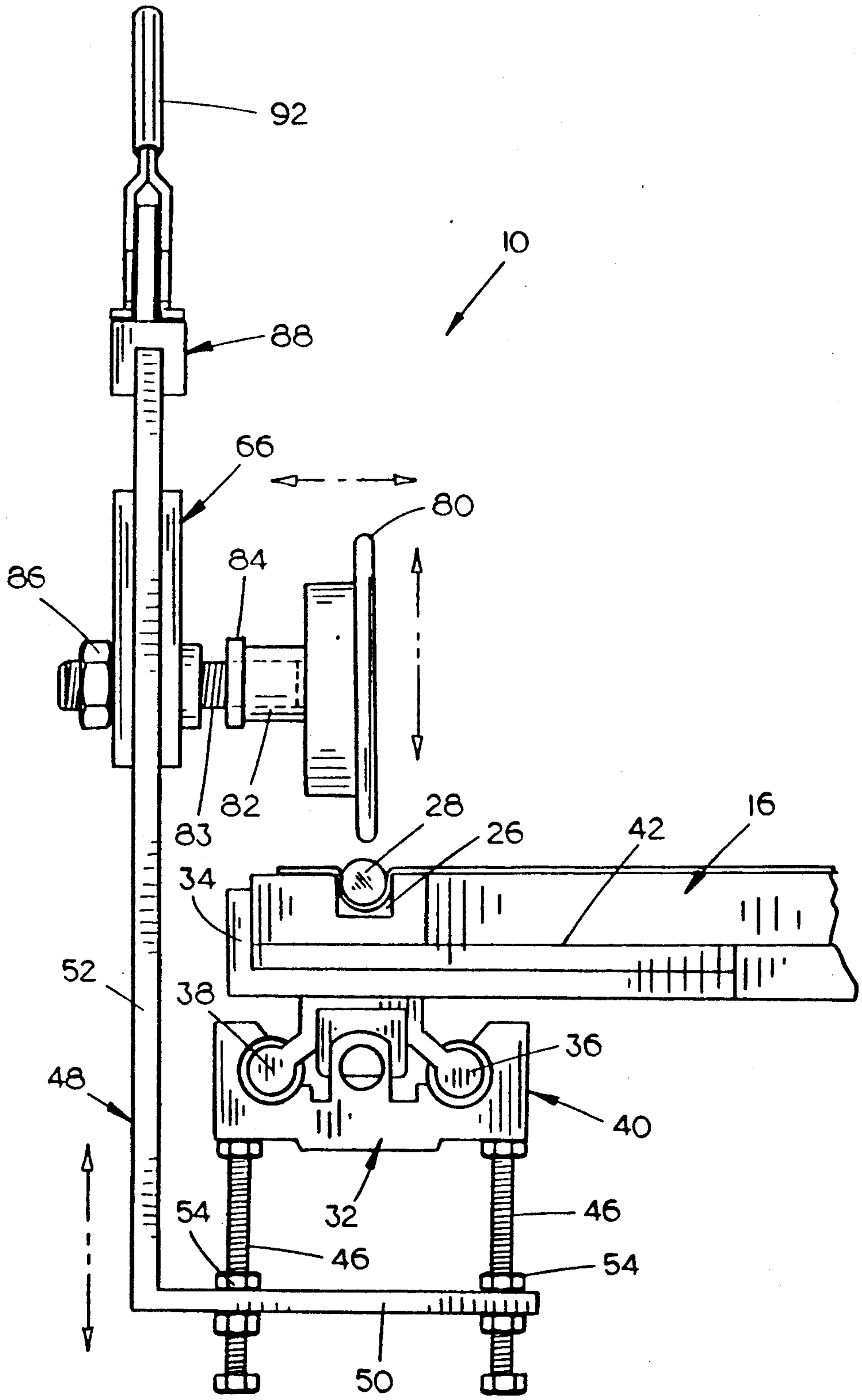
FIG. 4 is an end view of the apparatus of this invention.

The apparatus of this invention is referred to generally by the reference numeral 10 and which is positioned at one side of an elevated table 12 having at least one side edge 14. The numeral 16 refers to a conventional window screen frame which is normally comprised of an aluminum material. Frame 16 includes a top frame member 18, bottom frame member 20, and side frame members 22 and 24. Each of the frame members 18, 20, 22 and 24 are provided with a groove 26 (FIG. 4) formed in the outer surface thereof adapted to receive an elongated flexible spline 28 so that the screen material 30, which is normally a fiber mesh material, may be secured to the frame 16 to create the window screen.

A slide rail assembly 32 is secured to the table 12 at side edge 14 thereof beneath upstanding plate 34 against which the screen frame is positioned. Slide rail assembly 32 includes a pair of horizontally spaced apart slide rails 36 and 38. Slide 40 is slidably mounted on the slide rails 36 and 38. Resilient material 42 is positioned over the upper portion of the slide rail assembly 32 inwardly of the plate 34.

The numeral 44 refers to a carriage means which is operatively connected to the slide 40 by the bolts 46. Carriage means 44 includes an L-shaped bracket 48 including a horizontally disposed bracket portion 50 and a vertically disposed bracket portion 52. Bracket portion 50 is selectively vertically adjustably mounted on the bolts 46 by the nuts 54.

Figure 2:
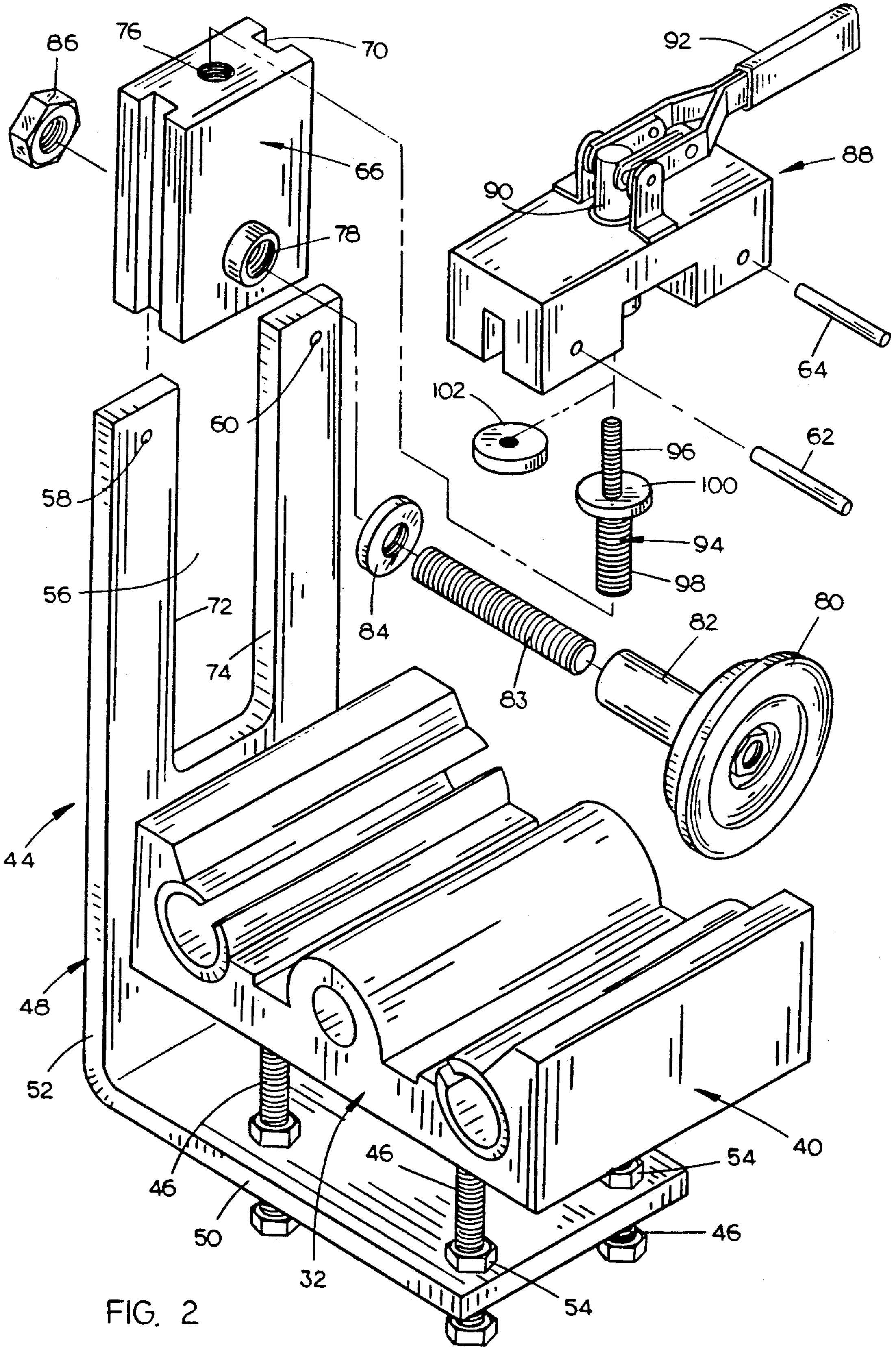
FIG. 2 is an exploded perspective view of the apparatus of this invention.
Figure 3:
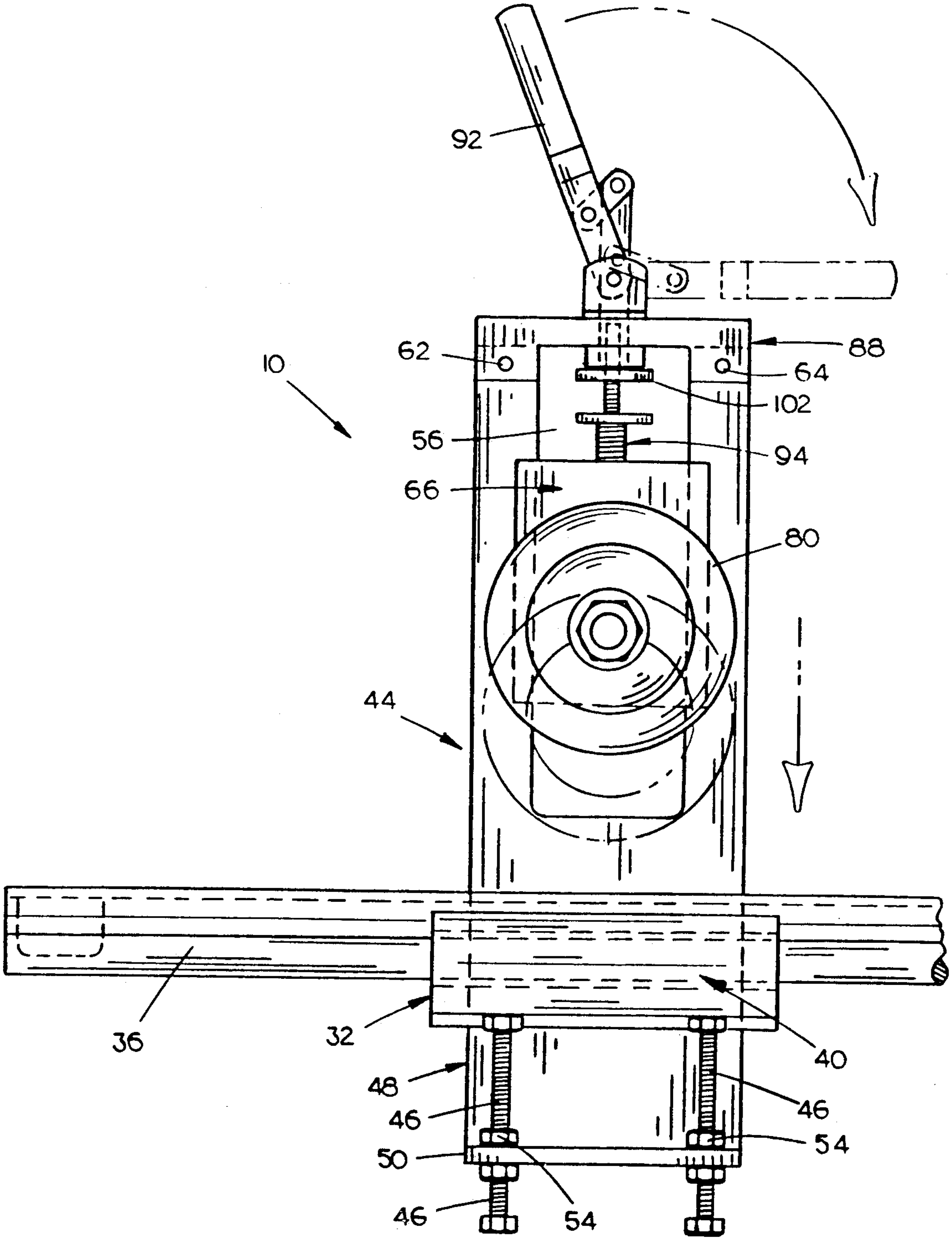
FIG. 3 is a side view of the apparatus of this invention.

Bracket portion 52 has a U-shaped opening 56 formed therein which extends downwardly thereinto as best seen in FIG. 2. The upper end of bracket portion 52 is provided with a pair of spaced apart openings 58 and 60 adapted to receive pins 62 and 64 therein respectively.

It is preferred that the bracket 48 be comprised of a steel material and that the slide body 66, which is slidably mounted on bracket portion 52, be comprised of a brass material. Slide body 66 includes a pair of grooves 68 and 70 at its opposite vertical edges which receive side edges 72 and 74 of bracket portion 52. Slide body 66 is provided with a vertically disposed, internally threaded opening 76 at its upper end, and a horizontally extending, internally threaded opening 78 adjacent its lower end.

The numeral 80 refers to a spline roller having axle 82 extending therefrom. Spline roller 80 is rotatably mounted on the axle 82 which is threadably secured to the stud 83. Axle 82 and the spline roller 80 are maintained in the desired position on study 83 by means of the lock nut 84 which abuts the end of the axle 82. Stud 83 is threadably inserted into the threaded opening 78 and is maintained therein by the nut 86.

Head 88 is positioned on the upper end of bracket portion 52 and is maintained thereon by the pins 62 and 64 extending therethrough and through the openings 58 and 60 respectively. Shaft 90 is vertically movably mounted in the head 88 and has a locking handle 92 pivotally secured thereto which is movable between locked and unlocked positions. When the locking handle 92 is in its horizontal or locked position, shaft 90 is in its lower most position relative to head 88. When the locking handle 92 is in its unlocked vertical position, the shaft 90 will be in its raised condition relative to the head 88.

The number 94 refers to an adjustment stud including an upper stud portion 96 and a lower stud portion 98. Thumb wheel 100 is secured to the stud 94 for rotating the same. Upper stud portion 96 has right hand threads while lower stud portion 98 has left hand threads. Stud portion 96 is threadably secured to the lower end of shaft 90 while the lower end of stud portion 98 is threadably received in the threaded opening 76 in slide body 66. Lock nut 102 is threadably mounted on stud portion 96 and may be moved into position against the lower end of shaft 90 to lock the stud 94 in its desired position.

Spline roller 80 may be selectively vertically moved with respect to head 88 by first loosening lock nut 102 and then rotating stud 94 in one direction or another. Threadable rotation of the stud 94 in one direction will cause the spline roller 80 to be moved downwardly relative to head 88 while threadable rotation of stud 94 in an opposite direction will cause spline roller 80 to be moved upwardly towards head 88. Lock nut 102 is then threadably rotated on stud portion 96 until it abuts against the lower end of shaft 90 to maintain the stud 94 in position. The fact that the spline roller 80 may be vertically moved relative to head 88 permits the apparatus to compensate for screen frames having various thicknesses.

Spline roller 80 may be moved horizontally relative to slide 66 by first loosening lock nut 84 and then threadably rotating axle 82 on stud 83. When the axle 82 is in the desired position, lock nut 84 is then threadably moved into abutting engagement with the end of the axle 82 to maintain the relative position between axle 82 and stud 83. The horizontal adjustable feature of the spline roller 80 relative to the slide 66 permits the apparatus to compensate for screen frames having various widths.

Figure 1:
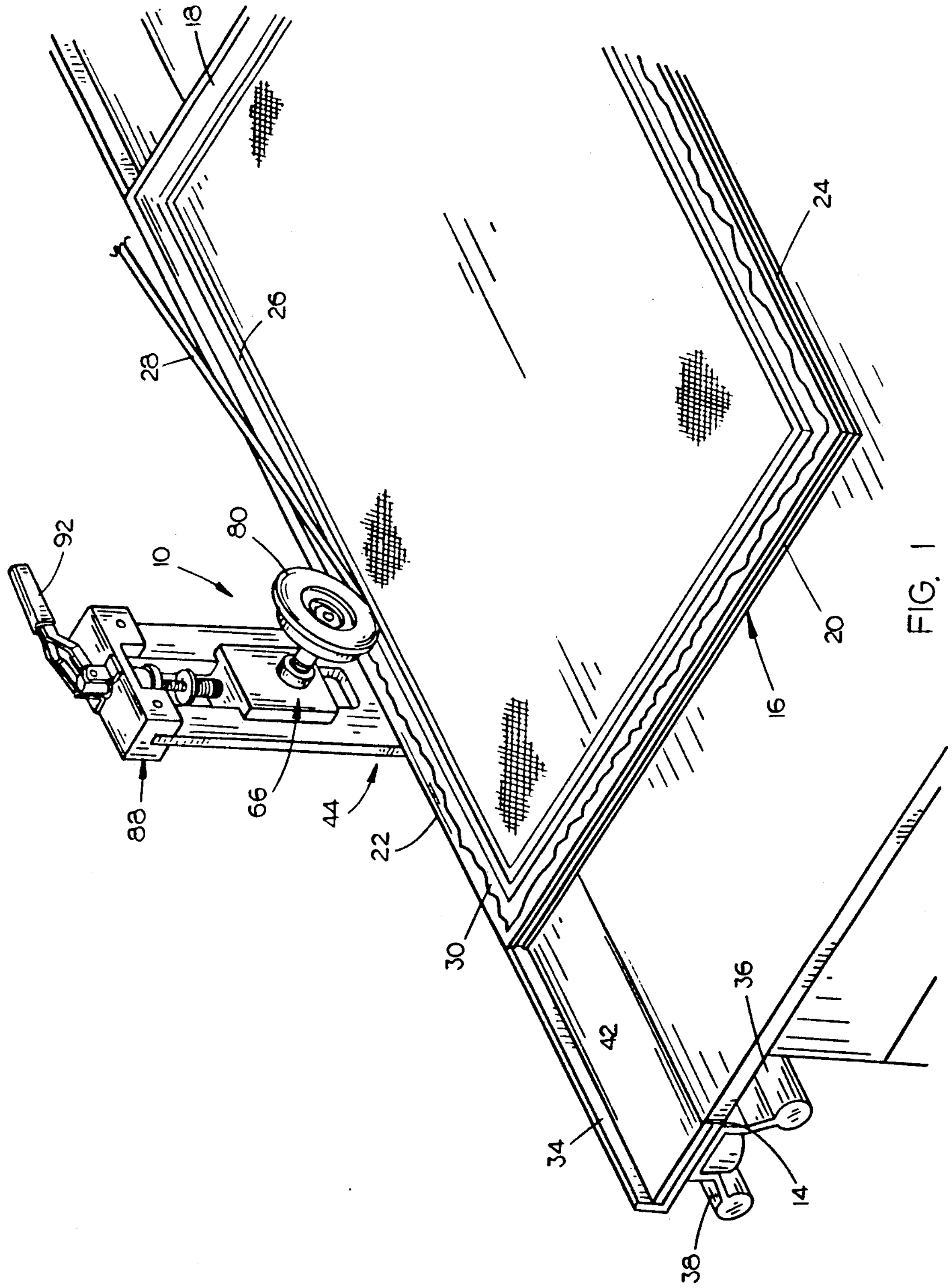
FIG. 1 is a perspective view illustrating the apparatus of this invention being employed to seat a flexible spline in the frame of a window screen.
Figure 5:
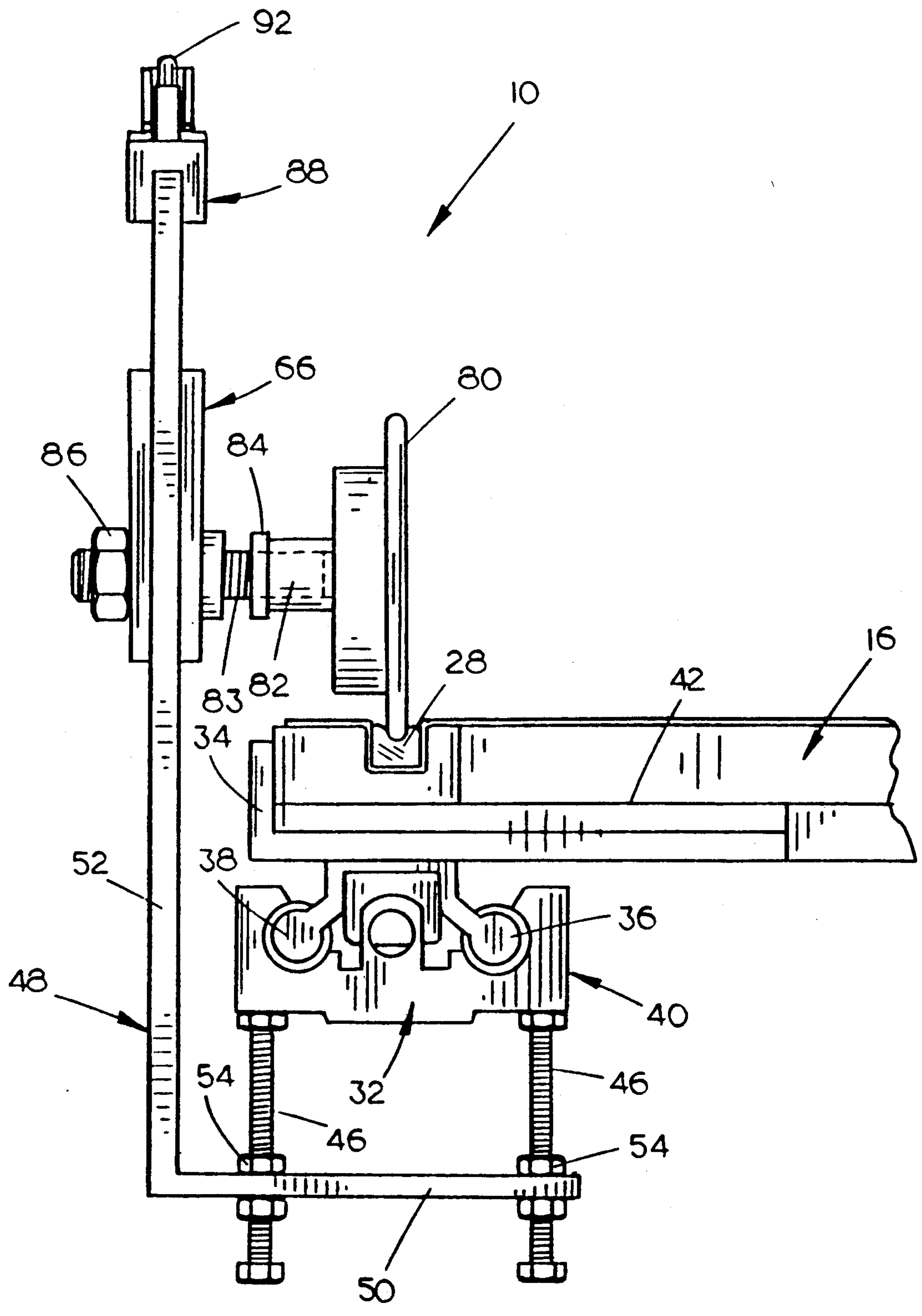
FIG. 5 is a view similar to FIG. 4 except that the spline roller has been lowered to an operative position.

When it is desired to secure the screen material 30 to the screen frame 16, the spline roller 80 is positioned in its upper inoperative position. The screen frame 16 is then placed adjacent the upstanding member 34 of one side of the table 12 as seen in FIG. 1. The screen material 30 is laid out over the screen frame and the spline 28 is positioned over the groove 26 at the end of the frame. Carriage 44 is then moved to the end of the side frame and the spline roller 80 is moved downwardly into the operative position illustrated in FIGS. 1 and 5 so that the periphery of the roller 80 forces the spline 28 and the screen material 30 downwardly into the groove 26. The carriage 44 is then moved from one end side frame of the screen to the other end with the spline 28 being progressively forced downwardly into the groove 26 by the roller 80 as the carriage is so moved. When the carriage reaches the end of the frame member, for example frame member 22, roller 80 is moved to its upper inoperative position by raising the handle 92 to its vertically disposed position. The screen frame is then rotated 90° so that the frame member 18 is adjacent the member 34. The roller 82 is then again lowered into its operative position so that the spline 28 will be forced downwardly into the groove 26 in the frame member 18. The procedure is repeated until the spline has been positioned in the groove around the entire screen frame. Once the spline 28 has been properly positioned, excess screen material 30 is trimmed with a razor blade or the like.

Thus it can be seen that a novel apparatus has been provided for positioning a flexible spline in a window screen frame to secure the flexible screen material to the frame. It can also be seen the apparatus of this invention may be adjustable to compensate for screen frames having varying thicknesses and widths. A further advantage of the apparatus of this invention is that the supporting structure for the carriage is positioned beneath the table and does not interfere with the operation of the apparatus.

Thus it can be seen that the invention accomplishes at least all of its stated objectives.

I claim:

1. An apparatus for seating an elongated flexible spline in the screen retaining groove of a screen frame to secure flexible screen material thereto, comprising, a table means including a substantially horizontally disposed top surface having at least one side edge, an elongated support means secured to said table means beneath said top surface at said one side edge, a carriage means selectively longitudinally movable mounted on said support means, said carriage means including a bracket member extending outwardly and upwardly from said support means, a slide member movable mounted on said bracket for selective vertical movement, a spline roller means rotatably mounted on said slide member and movable vertically therewith between a raised inoperative position and a lowered operative position, said spline roller means, when in its said inoperative position, permitting the window screen frame to be positioned therebelow adjacent said side edge of said table means and directly above said elongated support means, said spline roller means, when in its said operative position, engaging the spline to force the spline downwardly into the groove of the window screen frame whereby the flexible screen material positioned between the spline and the screen frame will be secured to the screen frame, and handle means operatively connected between said bracket member and said slide member for selectively moving the slide member between the raised and lowered positions.

2. The apparatus of claim 1 including means for selective horizontal adjustment of said spline roller relative to said slide member to permit the apparatus to be adjusted for screen frames having varying widths.

3. The apparatus of claim 1 including means for selective vertical adjustment of said spline roller relative to said slide member to permit the apparatus to be adjusted for screen frames having varying thicknesses.

* * * * *